(12) United States Patent
Simard et al.

(10) Patent No.: US 6,604,756 B2
(45) Date of Patent: Aug. 12, 2003

(54) TRIDEM AXLE SUSPENSION

(75) Inventors: André-Marie Simard, Baie St. Paul (CA); Réjean Lavoie, Baie St-Paul (CA)

(73) Assignee: Emmanuel Simard & Fils (1983) Inc., Baie St-Paul (CA)

( * ) Notice: Subject to any disclaimer, the term of this patent is extended or adjusted under 35 U.S.C. 154(b) by 8 days.

(21) Appl. No.: 09/940,451

(22) Filed: Aug. 29, 2001

(65) Prior Publication Data
US 2003/0042698 A1 Mar. 6, 2003

(51) Int. Cl.$^7$ ................................................. B60G 5/00
(52) U.S. Cl. ........................ 280/676; 280/682; 180/349
(58) Field of Search ............................. 280/676, 677, 280/682, 104, 124.157; 180/349

(56) References Cited

U.S. PATENT DOCUMENTS

| | | |
|---|---|---|
| 1,694,422 A | 12/1928 | Leytens |
| 2,032,721 A | 3/1936 | Schaefer |
| 2,579,582 A * | 12/1951 | Jahn et al. ................. 280/676 |
| 2,821,408 A | 1/1958 | Schwab |
| 3,121,574 A * | 2/1964 | Hockensmith, Jr. ......... 280/682 |
| 3,202,440 A * | 8/1965 | Apgar, Sr. ................ 280/686 |
| 3,219,360 A | 11/1965 | Schwab |
| 3,294,414 A * | 12/1966 | Apgar, Sr. ................. 280/682 |
| 3,762,487 A | 10/1973 | Bilas |
| 3,767,222 A | 10/1973 | Willetts |
| 4,033,606 A * | 7/1977 | Ward et al. ................. 280/682 |
| 4,278,271 A | 7/1981 | Raidel |
| 4,417,523 A | 11/1983 | Mariol |
| 4,486,029 A | 12/1984 | Raidel |
| 4,813,695 A | 3/1989 | Reid |
| 4,977,972 A | 12/1990 | Hicks |
| 5,088,758 A | 2/1992 | Wall et al. |
| 5,207,443 A | 5/1993 | Mitchell |
| 5,234,067 A | 8/1993 | Simard |
| 6,085,853 A | 7/2000 | Wernick |
| 6,135,220 A | 10/2000 | Gleasman et al. |
| 6,382,659 B1 * | 5/2002 | Simard ........................ 280/686 |

FOREIGN PATENT DOCUMENTS

DE                520672            2/1931

\* cited by examiner

*Primary Examiner*—Paul N. Dickson
*Assistant Examiner*—Faye M. Fleming
(74) *Attorney, Agent, or Firm*—Robic

(57) ABSTRACT

A triple axle suspension for use in a vehicle having a front axle, a medium axle and a rear axle mounted in triple axle relationship. It makes use of rigid beams to support the axles. It also makes use of equalizers to interconnect the beams, and it is devised in such a manner that one end of each beam is free to slide within the adjacent supporting structure. This suspension is very simple in structure and very efficient to equalize the load of any axle over all the axles of the triple axle suspension. When the axles are motorized, the suspension is also efficient to balance the pulls exerted by the wheels supported by the axles.

4 Claims, 3 Drawing Sheets

TRIDEM AXLE SUSPENSION

BACKGROUND OF THE INVENTION a) Field of the Invention

The present invention relates to a triple axle suspension for use in a vehicle having a frame below which a front axle, a medium axle and a rear axle are mounted in a triple axle relationship.

b) Brief Description of the Prior Art

Triple axle suspensions for use to equalize the load over three adjacent axles of large vehicles such as trucks or semi-trailers, are already known. In support of this contention, reference can be made, by way of non-restrictive examples, German patent No. 520,672 of 1931 and to U.S. Pat. Nos. 2,032,721 of 1936; U.S. Pat. No. 2,821,408 of 1958; U.S. Pat. No. 3,219,360 of 1965; U.S. Pat. No. 3,762,487 of 1973 and U.S. Pat. No. 4,813,695 of 1989.

In such a suspension, it is of common practice to use equalizers that are rockably mounted under the frame of the vehicle and connected to springs supporting the axles in such a manner as to distribute unequal loading of any axle to all the axles of the triple axle suspension, in particular when the vehicle moves on an uneven road or trail or passes over a bump. Once again, reference can be made to the above-mentioned patents.

In the field of vehicle suspensions, it is also known to use rigid beams to support the axles of the vehicle, instead of using springs (see, for example, U.S. Pat. No. 3,219,360 mentioned hereinabove). However, in such a case, other means must be provided to <<absorb>> the up and down motions of the axles when the vehicle is moving, and to equalize the load over all of axles.

In the field of vehicle suspensions, it is further known to let at least one of the ends of an axle supporting spring free to slide relative to a supporting hanger in order to absorb the up and down motions of the axle supported by this spring. In this connection, reference can be made to U.S. Pat. No. 3,767,222 of 1973 and U.S. Pat. No 4,486,029 of 1984.

However, so far, no one seems to have ever thought of combining all these knowledges in a triple axle suspension in order to improve the efficiency and reliability of the same.

SUMMARY OF THE INVENTION

The object of the present invention is to provide a triple axle go suspension for use in a vehicle, which suspension is very simple in structure, very efficient to equalize the load over the three adjacent axles of the vehicle and very reliable in use.

The triple axle suspension according to the invention makes use of rigid beams to support the axles. It also makes use of equalizers and it is devised in such a manner that one end of each beam is free to slide within the adjacent supporting equalizer or hanger.

As aforesaid, the triple axle suspension according to the invention is intended to be used in a vehicle having a frame below which a front axle, a medium axle and a rear axle are mounted in a triple axle relationship.

It basically comprises, on each side of the vehicle a front axle supporting beam having a front end pivotably connected to a first hanger projecting downwardly from the frame, and a rear end;

a first equalizer rockably mounted onto a second hanger projecting downwardly from the frame, the first equalizer having a front portion through which the rear end of the front axle supporting beam is slidably mounted, and a rear portion;

a medium axle supporting beam having a front end pivotably connected to the rear portion of the first equalizer, and a rear end;

a second equalizer rockably mounted onto a third hanger projecting downwardly from the frame, the second equalizer having a front portion through which the rear end of the medium axle supporting beam is slidably mounted, and a rear portion; and a rear axle supporting beam having a front end pivotably connected to the rear portion of the second equalizer, and a rear end slidably mounted onto a fourth hanger projecting downwardly from the frame.

As it can be appreciated, this suspension is very simple in structure. This suspension is also efficient to equalize the load of any axle over all the axles of the triple axle suspension. When the axles are motorized, the suspension according to the invention may further balance the pulls exerted by the wheels supported by the axles between all of them.

The invention and its advantages will be better understood upon reading the following non-restrictive description of a preferred embodiment thereof, made with reference to the accompanying drawings.

DESCRIPTION OF A PREFERRED EMBODIMENT OF THE INVENTION

Figure 1:
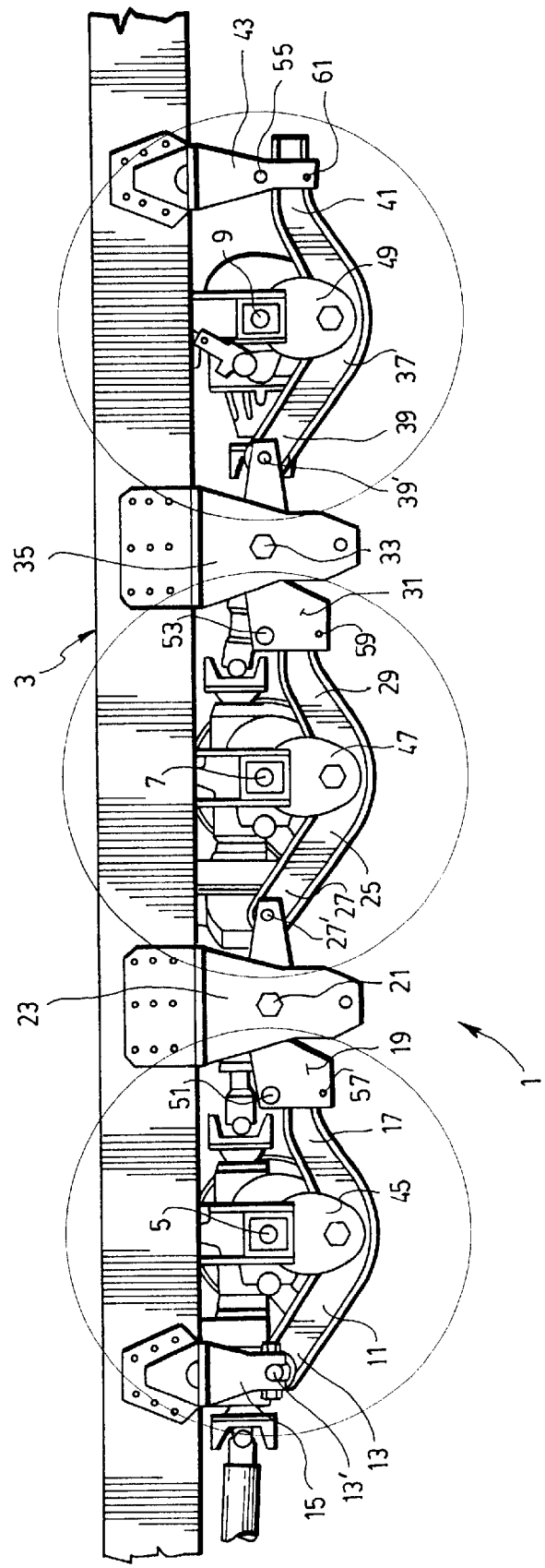
FIG. 1 is a side elevational view of a triple axle suspension according to a preferred embodiment of the invention, the suspension as it is illustrated, being used in combination with a triple drive axle system.

The triple axle suspension 1 according to the preferred embodiment of the invention as shown in the accompanying drawing is intended to be used in a vehicle having a frame 3 below which a front axle 5, a medium axle 7 and a rear axle 9 are mounted in triple relationship.

The suspension 1 comprises a plurality of similar structural elements on each side of the vehicle.

These elements include a front axle supporting beam 11 having a front end 13 pivotably connected by means of an horizontal pin 13' to a first hanger 15 projecting downwardly from the frame. The beam 11 also has a rear end 17.

Also included is a first equalizer 19 rockably mounted by means of an horizontal pin 21 onto a second hanger 23 projecting downwardly from the frame. This first equalizer 19 has a front portion in which the rear end 17 of the front axle supporting beam 11 is slidably mounted, and a rear portion.

Further included is a medium axle supporting beam 25 having a front end 27 pivotably connected by means of a pin 27' to the rear portion of the first equalizer 19. This beam 25 also has a rear end 29.

Further included is a second equalizer 31 rockably mounted by means of an horizontal pin 33 onto a third hanger 35 projecting downwardly from the frame. This second equalizer 31 has a front portion in which the rear end 29 of the medium axle supporting beam 25 is slidably mounted, and a rear portion.

Last of all, the suspension includes as other structural element, a rear axle supporting beam 37 having a front end 39 pivotably connected to the rear portion of the second equalizer 31 by means of a pin 39', and a rear end 41 slidably mounted onto a fourth hanger 43 projecting downwardly from the frame 3.

In the illustrated preferred embodiment, the front, medium and rear axle supporting beams 11, 25 and 37 are V-shaped and the front, medium and rear axles 5, 7 and 9 are centrally fixed on top of them by means of brackets 45, 47 and 49, respectively. However, the beams could have a different shape and the axles could be connected thereto in a different manner and/or by other means. Such is rather conventional and need not be further described.

In the illustrated preferred embodiment, the rear ends 17, 29 and 41 of the front, medium and rear axle supporting beams 11, 25 and 37 are also curved so as to extend substantially horizontally. Such is particularly useful to facilitate free sliding mounting of the rear ends of the beams 11, 25 and 37 out the front portions of the first and second equalizers 19 and 31 and onto the fourth hanger 43, respectively.

Figure 2:
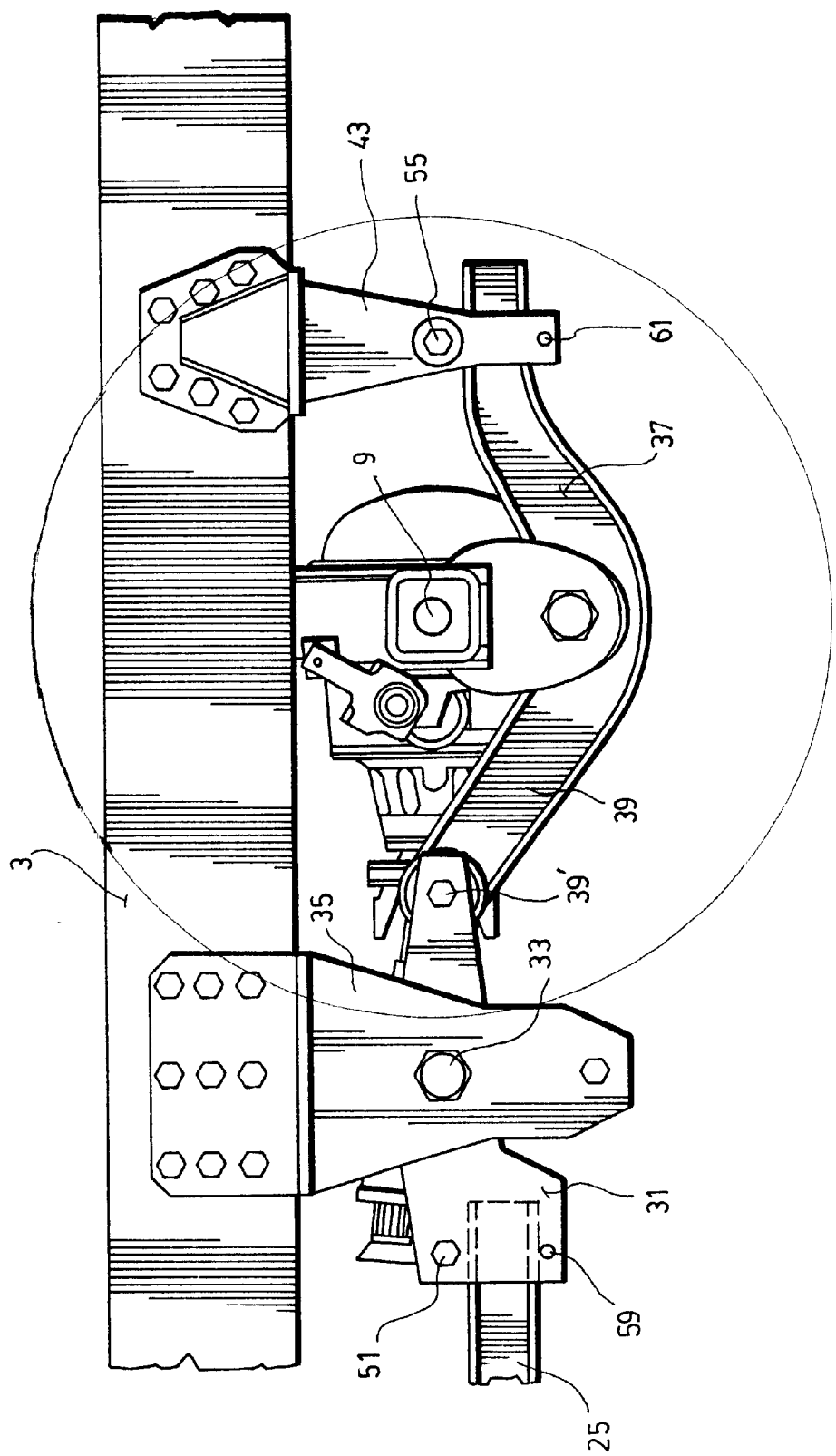
FIG. 2 is a side elevational view in partial cross-section of the rear portion of the suspension shown in FIG. 1.

As is better shown in FIG. 2, the front portions of the first and second equalizers 19 and 31 and the fourth hanger 43 each preferably comprises a roller 51, 53, 55 under which the rear ends 17, 29 and 41 of the front, medium and rear axle supporting beams 11, 25 and 37 extend and bear. The rollers 51, 53 and 55 facilitate the requested sliding of the rear ends 17, 29 and 41 when the supporting beams 11, 25 and 37 pivot and the first and second equalizers 19 and 31 are rocked (see FIG. 4). It is worth noting however that means other than a roller could alternatively be used for slidably mounting the rear end of each beam onto the adjacent structure. By way of example, use could be made of a sleeve which would be pivotably mounted to the structure and through which the rear end of the corresponding beam could be free to slide. However, such would be structurally more complicated than the use of a roller.

Even though such is not compulsory, the front portions of the first and second equalizers 19 and 31 and the fourth hanger 43 may each comprise a locking pin 57, 59, 61 extending below the corresponding roller 51, 53, 55 to prevent the rear ends 17, 29 and 41 of the front, medium and rear axle support beams from moving down too far away from the corresponding rollers in the case of a jump on the road or trail.

Figure 3:
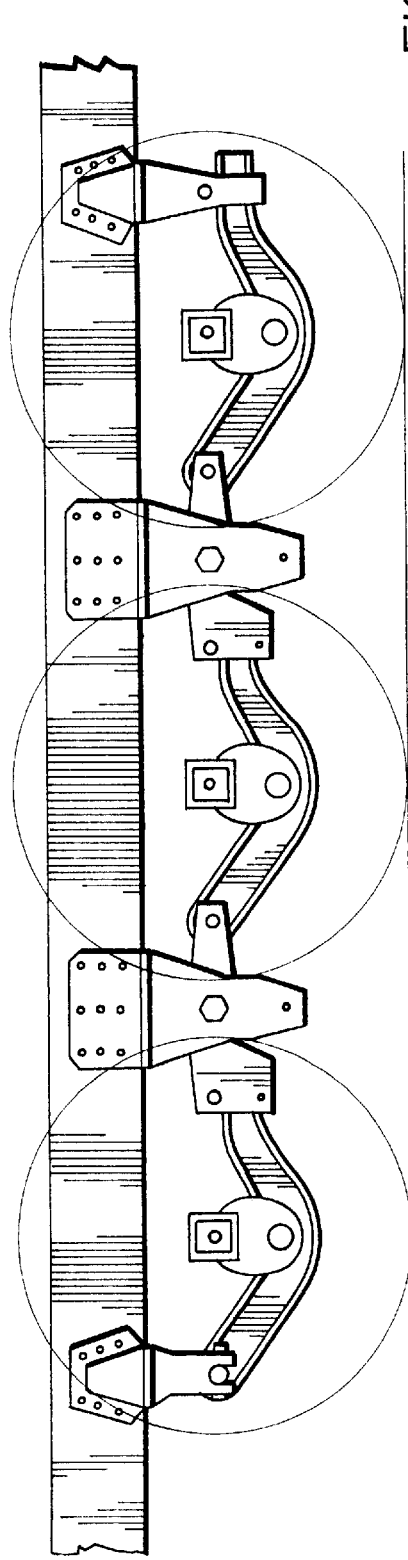
FIG. 3 is a view similar to the one of FIG. 1, but without the triple drive axle system.
Figure 4:
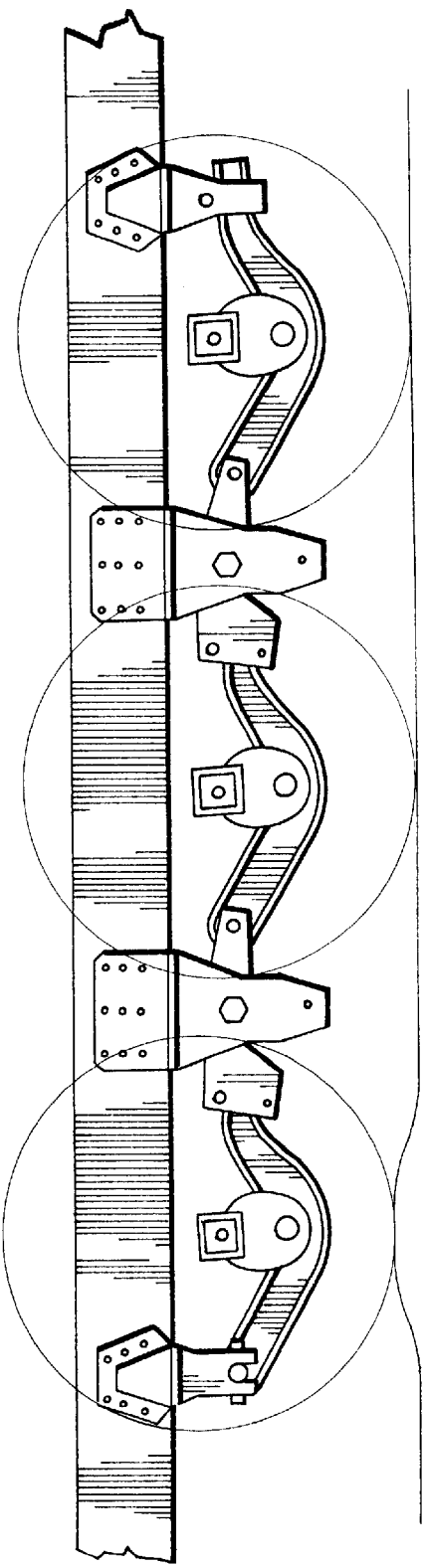
FIG. 4 is a view similar to the one of FIG. 3, when the front axle passes over a bump.

As it can be understood by comparing FIG. 3 with FIG. 4, the suspension 1 according to the invention actually permits to equalize the load over the three adjacent axles 5, 7 and 9 of the vehicles which is preferably a large and "heavy" vehicle, like a truck or semi-trailer. This suspension is very simple in structure. Tests carried out by the inventor have also shown that it is very efficient and reliable in use.

Moreover, the suspension 1 is "compatible" with conventional triple drive axle, systems like the one illustrated in FIG. 1 or the one disclosed in U.S. Pat. No. 4,977,972 of 1990. As a matter of fact, when used with such a drive axle system, the suspension 1 according to the invention permits to balance the pulls exerted by the wheels supported by the axles between all of said wheels whatever be the shape and/or lateral inclination of the road or trail on which the vehicle moves.

Of course, numerous modifications could be made to the preferred embodiment disclosed hereinabove without departing from the scope of the invention. By way of examples, the particular shape, structure and assembly of the hanger 15, 23, 35 and 43 could be different from what is illustrated, provided of course that they have the same function. Similarly, the shape of the beams 17, 29 and 37 could be different.

What is claimed is:

1. A triple axle suspension for use in a vehicle having a frame below which a front axle, a medium axle and a rear axle are mounted in a triple axle relationship, said suspension comprising, on each side of the vehicle:

a rigid front axle supporting beam having a front end pivotably connected to a first hanger projecting downwardly from the frame, and a rear end;

a first equalizer rockably mounted onto a second hanger projecting downwardly from the frame, said first equalizer having a front portion through which the rear end of the front axle supporting beam is slidably mounted, and a rear portion;

a rigid axle supporting beam having a front end pivotably connected to the rear portion of the first equalizer, and a rear end;

a second equalizer rockably mounted onto a third hanger projecting downwardly from the frame, said second equalizer having a front portion through which the rear end of the medium axle supporting beam is slidably mounted, and a rear portion; and a rigid rear axle supporting beam having a front end pivotably connected to the rear portion of the second equalizer, and a rear end slidably mounted onto a fourth hanger projecting downwardly from the frame.

2. The triple axle suspension of claim 1, wherein the front portions of the, first and second equalizers and the fourth hanger each comprise a roller under which the rear ends of the front, medium and rear axle supporting beams extend and bear, said rollers facilitating sliding of said rear ends when the supporting beams pivot and the first and second equalizers are rocked.

3. The triple axle suspension of claim 2, wherein the front portions of the first and second equalizers and the fourth hanger each comprise a locking pin extending below the corresponding roller to prevent the rear ends of the front, medium and rear axle support beams from moving down away from the corresponding rollers in the case of a jump.

4. The triple axle suspension of claim 3, wherein:

each of the front, medium and rear axle supporting beams is substantially V-shaped;

the front, medium and rear axles are centrally fixed on top of said front, medium and rear axle supporting beams; and the rear ends of said front, medium and rear axle supporting beams are curved so as to extend substantially horizontally.

* * * * *